3,005,197
HERTZIAN WAVE SPACE SCANNING
AND VIEWING
Douglas G. Shearer, Los Angeles, Calif. (% Metro-Goldwyn-Mayer Studios, Culver City, Calif.)
Filed Mar. 20, 1950, Ser. No. 150,682
26 Claims. (Cl. 343—112)

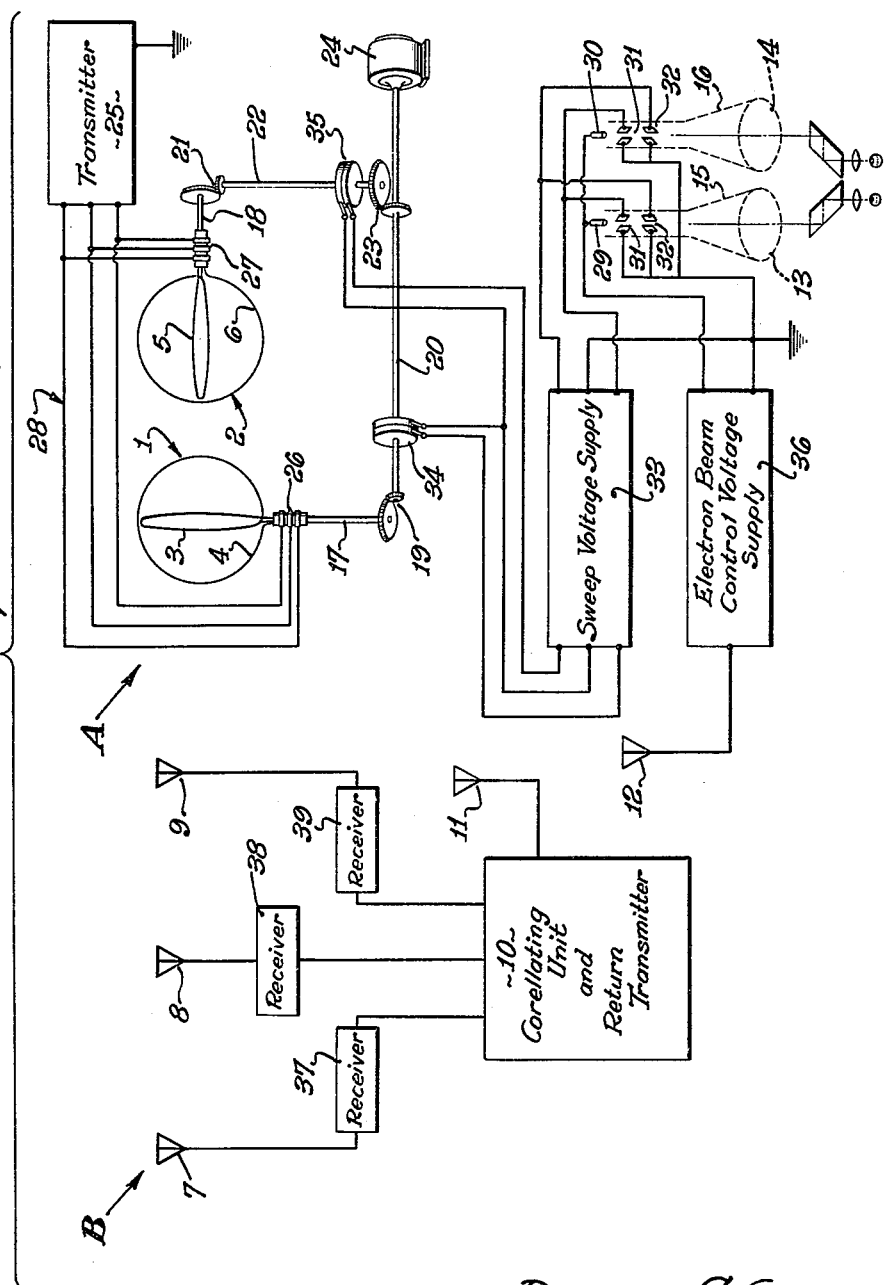

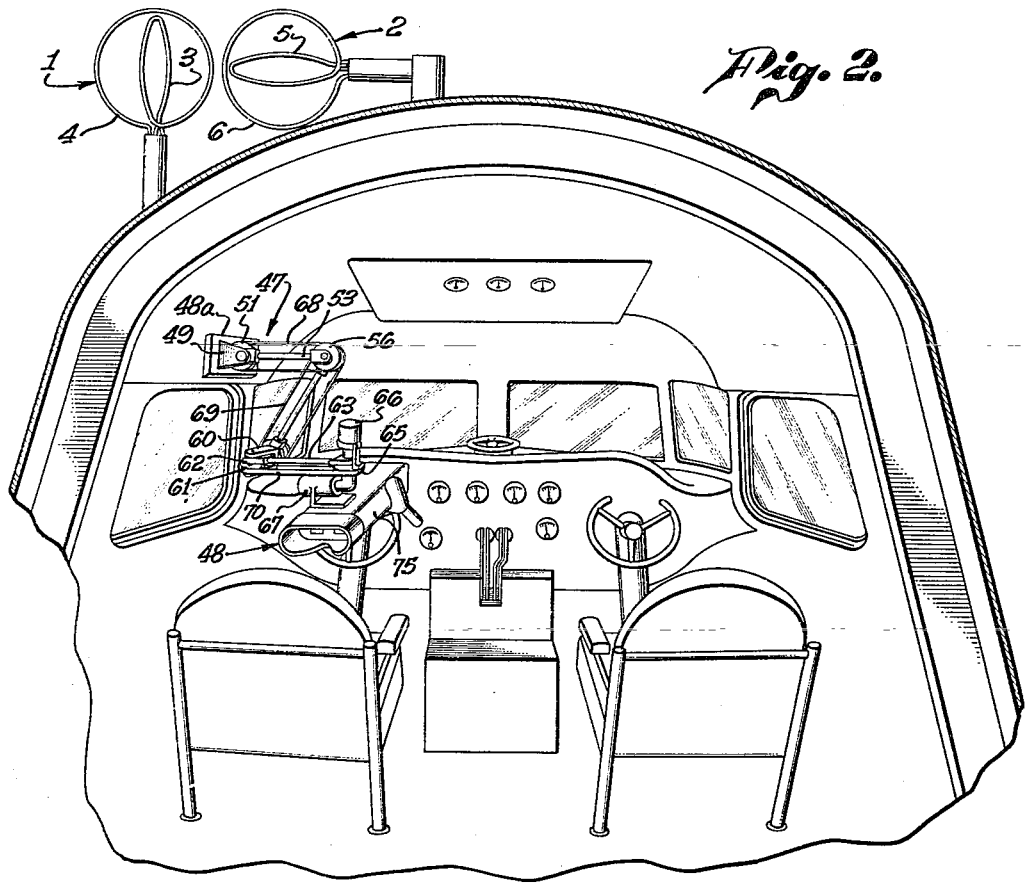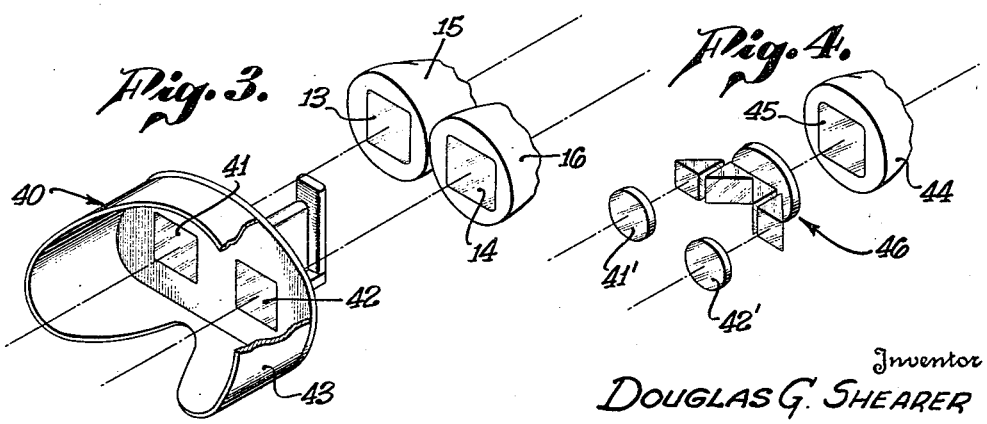

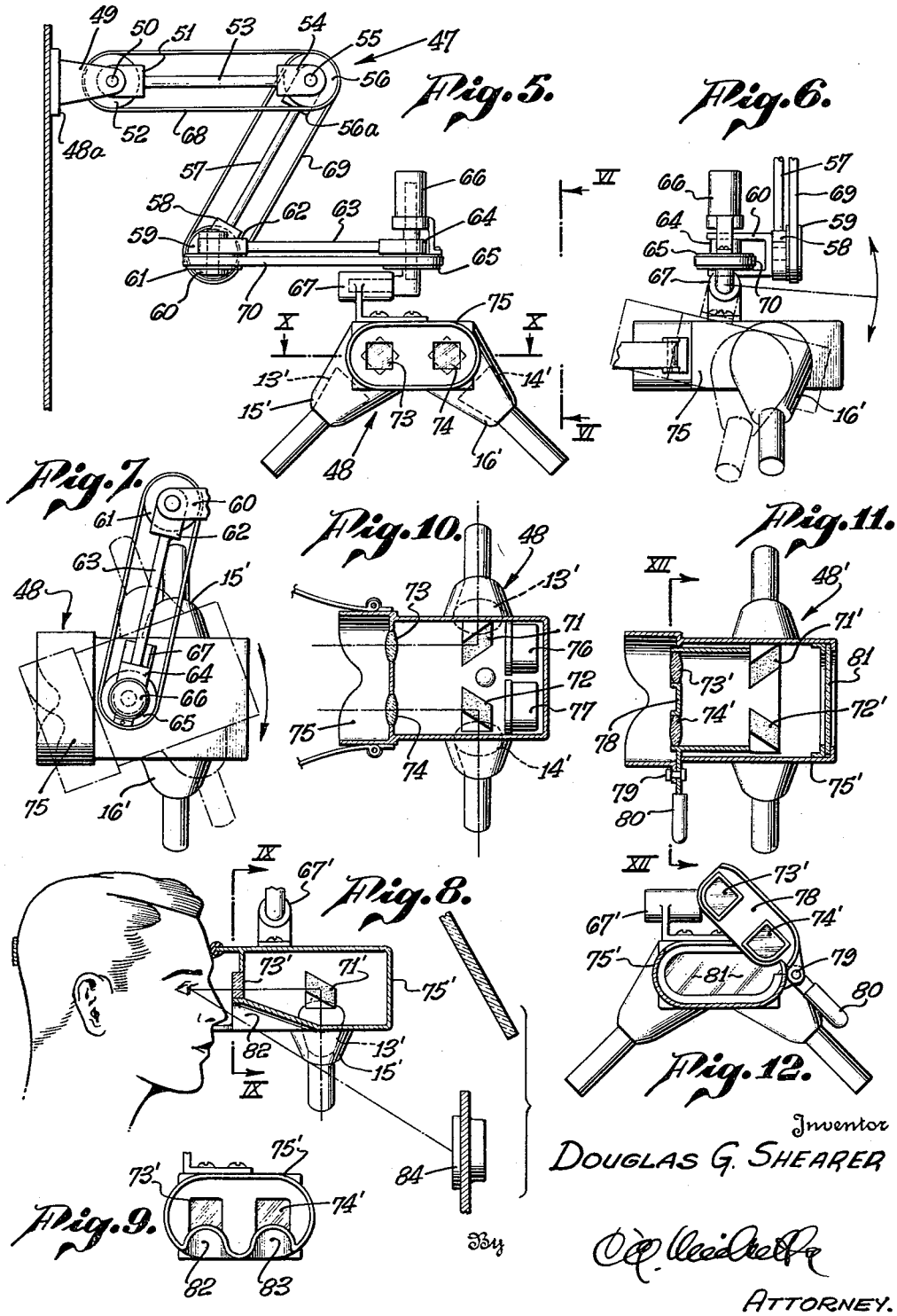

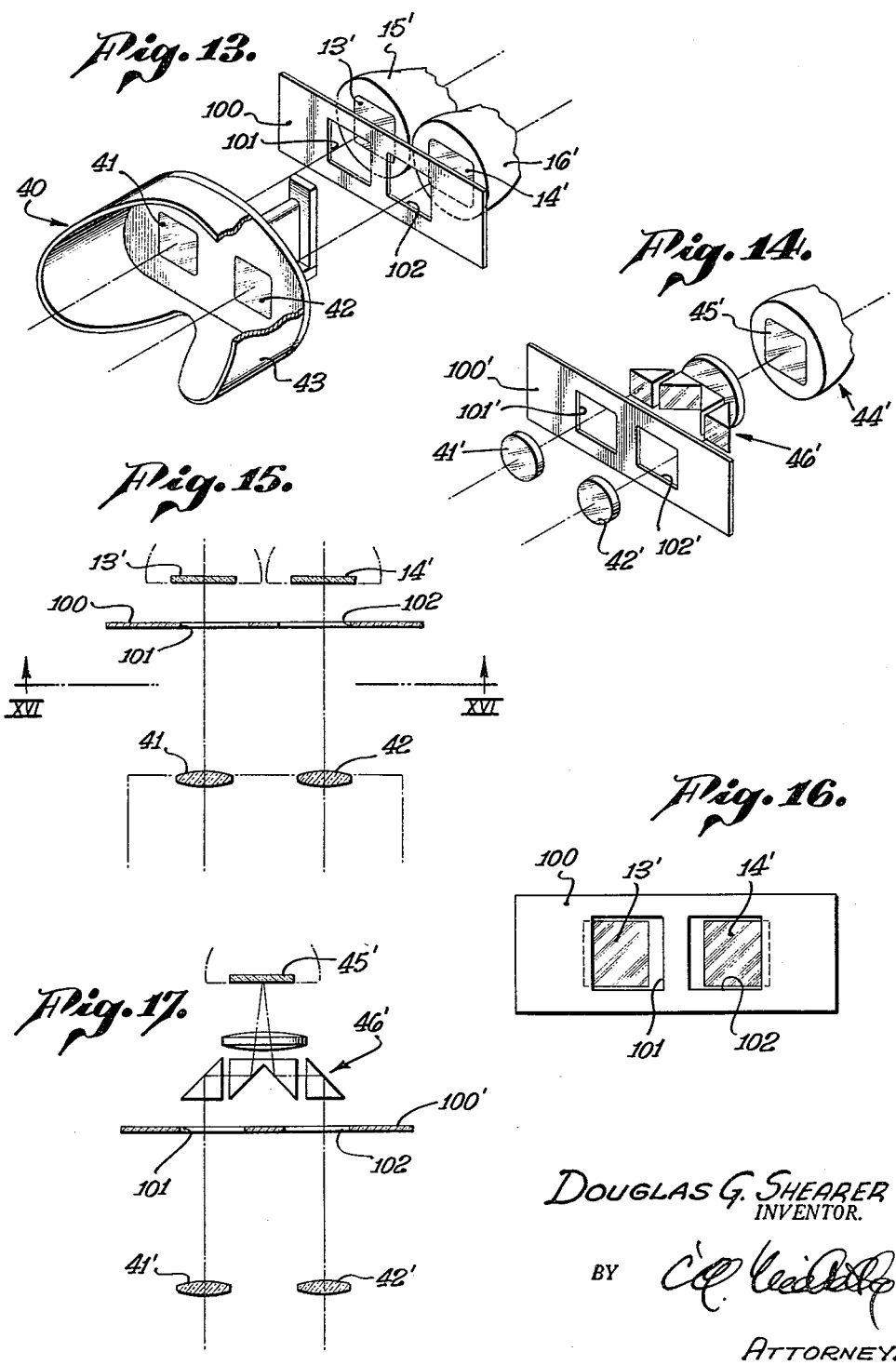

This invention relates generally to improved systems and methods for space scanning by means of Hertzian waves and producing a visually observable image corresponding to at least one or more points within the spatial segment scanned. Means are provided for producing an artificial image of selected points, patterns, or scenes and means are provided whereby the imagery of such points, patterns, or scenes is accomplished by Hertzian wave frequencies of radiation. Means are provided for conducting intelligence corresponding to the imagery components to a viewing point where such intelligence is by a cathode ray tube transformed into an artificial image of the original points, patterns, or scenes in a manner to retain true perspective of the original points, patterns or scenes from that viewpoint. The present invention also contemplates the use of improved means and methods for viewing the image produced whereby the point or points within the space segment scanned appear in perspeceive and with three-dimensional characteristics which would be present if the points could be seen directly. Means are provided for viewing the artificial images luminescently produced whereby the convergence and focus of a viewer's eyes are relaxed to a condition substantially at infinity focus and convergence and whereby the virtual angle subtended by any and all objects in the original patterns or scenes are substantially duplicated in the eyes of the viewer.

More particularly, the preferred form of the invention relates to an aircraft landing system and method employing space scanning wherein a properly spatially oriented, true perspective view of selected points identifying, defining or marking a landing strip or airport may be automatically presented to a pilot in an aircraft approaching the landing strip or airport and may be viewed by the pilot of the aircraft as he approaches the landing strip and lands the aircraft on the landing strip or airport. The system and methods of the present invention operate irrespective of weather conditions, although primarily intended for use under minimum visibility conditions.

The purpose of such system and methods is to provide the pilot with a view similar to that which he would see when landing an aircraft at night on a landing strip outlined or suitably marked with beacon lights. It should also be noted that the improved viewing means of the present invention for viewing the image of selected points adjacent the landing strip functions in such manner that the illusion of actual distance viewing is produced, thereby allowing the pilot the full use of visual perception in landing the aircraft.

The present invention is a very considerable advance over the prior art attempts to solve the "blind landing" problem, which is one of the major problems of commercial air transport and aviation in general. One of the major advantages of the present invention is that the pilot lands an aircraft in his accustomed manner through the use of his normal sensory perception channels in the accustomed manner in which his previous training has made him adept. In other words, the pilot, when being trained, learns to fly an airplane by visual contact. Takeoffs and landings are accomplished primarily through visual perception and spatial orientation. Through repeated experience, this becomes second nature of the pilot and is always and easiest and most natural way for him to land an airplane. It is true that later the pilot generally takes training in instrument flying; however, this is not a natural, direct means of perceiving the pertinent factors and spatial relations involved in landing the airplane, since the information takes an indirect route before it becomes a final, useful concept in the brain of the pilot. This unnaural way of forming a mental concept of the situation greatly increases the possibility of error.

This possibility of error resulting from indirect, devious perception of the salient factors affecting flying conditions can easily be understood when it is considered that the pilot of a large, modern transport airplane, or, in fact, of any of the modern airplanes, is required to examine and maintain effective contact with a very large number of instruments in order to be constantly aware of the values of and/or variations in the values of a number of important variables affecting the aircraft. For example, air speed, engine speed, turn and bank indicators, altimeters, compasses, and numerous other instruments too numerous to mention here must be observed frequently in order to properly control the aircraft.

Through the use of the system and methods of the present invention a pilot needs no instrument flying experience, since he will be landing the airplane under conditions of apparent visual contact with selected points identifying the airport or landing strip.

Prior systems and methods for solving the blind landing problem have included I.L.S. (Instrument Landing System), wherein the pilot watches an instrument which indicates the airplane's deviation from a predetermined glide path; G.C.A. (Ground Controlled Approach), wherein the pilot is "talked into" a landing by a ground controller who sees a radar-produced image of the airplane on the screen of a cathode ray tube; and others, including modifications of the two systems specifically mentioned. None of these prior art systems permits the pilot to respond to stimuli even approaching those to which he has been trained, in ordinary landing practice, to respond. None gives to the pilot, for instance, any intelligence as to the attitude of the airplane, a most important factor during landing; similarly, none keeps the pilot on his correct course, but rather indicates by mechanical or other means a correction to be made by the pilot after he has moved off the correct path.

Generally speaking, the Hertzian wave scanning and spatial orientation system and method of the present invention comprise a viewing station and at least one remote viewed station. Antenna means having effective directional radiation characteristics is provided at the viewing station and is arranged to effectively scan a selected space segment by producing in said space segment a Hertzian wave pattern differing at various points in accordance with the coordinates of said points with respect to the viewing station antenna means. Hertzian wave receiving means at the viewed station provided with antenna means is arranged to receive the Hertzian wave pattern. Means cooperating with the Hertzian wave receiving means at the viewed station arranged to transmit a radio signal carrying intelligence as to the coordinates of the antenna means at the viewed station with respect to the antenna means at the viewing station back to the viewing station are provided. Means are also provided at the viewing station for translating the intelligence-carrying signal into a visual image of the location of the antenna means at the viewed station from the position of the viewing station.

It should be noted that dynamic sequentially produced Hertzian wave pattern in the sense used herein means a pattern varying as a function of time and wherein some characteristic of the pattern in space is sequentially produced such as occurs in the specific form described and illustrated herein, and static Hertzian wave space pattern as used herein is intended to mean a Hertzian wave pattern which varies in accordance with space or angular coordinates and does not have some sequentially produced moving scanning characteristic. The term "static" used therein does not mean, however, that the pattern does not change at all with respect to time, but merely means that the pattern at all points varies similarly with time and therefore the time variation may be ignored and the pattern considered in the limited sense used herein as static.

Generally speaking, the improved viewing means and method of the present invention include means for producing light patterns corresponding to components of original scenes or spatial locations and optical viewing means arranged for use by an observer in ocularly receiving the light patterns in a manner minimizing ocular accommodative effort.

It should be noted that the Hertzian wave scanning and spatial orientation system and method of the present invention may effectively scan a selected space segment by producing therein a static Hertzian wave pattern having different characteristics in accordance with angular coordinates, such as, for example, phase displacement of components of the Hertzian wave pattern in accordance with angular coordinates in at least two different directions, one form of which is more specifically described, illustrated and claimed in copending application of Douglas G. Shearer and William W. Brockway, Serial No. 150,681, filed concurrently herewith, and now Patent 2,650,359, or arranged to produce a dynamically varying, sequentially produced Hertzian wave pattern in the selected space segment dynamically differing at various points in accordance with the space-time coordinates of said points with respect to the viewing station antenna means, such as, for example, the pattern produced by two directional antennae arranged to simultaneously scan the selected space segment by means of mechanical movement thereof in different directions and in a manner whereby the selected space segment is effectively sequentially scanned by a characteristic, predetermined value of the Hertzian waves radiated from the two transmitting antenna means scanning in different directions. This predetermined Hertzian wave characteristic is preferably, although not necessarily, a point of null Hertzian wave transmission.

It should also be noted that the viewing means of the present invention includes, but is not limited to, an arrangement whereby two spaced images are produced which emit two light patterns which are received by optical viewing means arranged to cooperate with an observer's eyes and to refract and direct said light patterns into the observer's eyes without material muscular focusing and convergence of the observer's eyes. The two spaced light patterns may be produced from a single image by beam-splitting means, if desired.

Furthermore, the two spaced images may be surrounded by masking means, the outline of which may represent in silhouette the frame of a windshield of an airplane (or other vehicle) with a normal binocular spatial stereopsis relationship as seen from the viewpoint of the pilot or operator, to enhance the realistic value of the visual presentation and to serve as a realistic reference to be used in forming a mental concept of the attitude and position of the aircraft or other vehicle with respect to the view enclosed by the masking means.

It can be seen from the above general description of the present invention that the hereinabove-mentioned disadvantages of prior art systems are avoided and that a true perspective visual image carrying visible indications corresponding to selected locations around an airport or landing strip as normally seen from the position of an approaching aircraft will be produced in the aircraft for use by the pilot in landing the aircraft, and that in the preferred form of the present invention, wherein the improved viewing means arranged to minimize ocular accommodative effort of the pilot's eyes is utilized, the mental concept formed by the pilot from the image viewed in the field of view is virtually identical to that which would be formed by the pilot viewing the airport from the same position as the transmitting antennae and with the positions of the viewed station radio receiver means around the airport indicated by strip or border lights. Full depth perception and relative spatial and angular relationships of the various receiver or viewed station antenna means locations around the airport will be perceived by the pilot and utilized in making a safe landing.

The reason for this illusion of natural, normal spatial viewing conditions when employing the viewing means of the present invention is explained in the following and involves what I call "motion stereopsis". I have discovered that when viewing a scene at medium or long distance, depth perception, relative distance and spatial relationship of the various components of the scene viewed are due primarily to motion stereopsis. This is not the usually understood "binocular parallax" stereoscopic effect by which spatial intelligence is conveyed by reason of the slight differences in the two views seen by the separate eyes of an observer in looking at nearby objects. Under such binocular stereoscopic viewing, each eye sees a slightly different view of a given scene, and the components of the scene have different parallactic displacements in the individual view from each eye (or image frame) in accordance with distance from the eyes. This type of binocular stereoscopic vision (which is classically considered to be the sole cause of stereoscopic vision) is effective only at relatively short distances, since at medium or longer distances, the ratio of the base line of the triangle formed by the interpupillary distance between each of the observer's eyes and the length of the line of sight from the eyes toward the viewed scene is too small to make possible any noticeable parallactic effect. Therefore, such binocular stereoscopic viewing is ineffective for medium or long-distance viewing conditions, and is not the cause of conveying a sense of depth perception and relative spatial orientation and relationship between component parts of a scene at any distance and is ineffective and is not a part of a pilot's visual orientation stimulus during the normal approach of an aircraft toward an airstrip for landing purposes, since a pilot does not look at any nearby objects during the above operation, even at the time the actual landing is being made. It is a well-known fact that a pilot looks a considerable distance in front of him down the airstrip to make a proper landing, and not at any nearby points in front of him, downward or to the side.

However, even under quite distant viewing conditions, if relative motion between the observer and the entire scene viewed or individual components of the scene viewed, takes place, a sort of sequential or motion stereopsis occurs. In other words, successive views of the scene, each of which is progressively separated from the preceding view by a time interval, however small, will show different components of the scene in different relative positions and spatial relationships in a manner quite similar to the difference between the views seen simultaneously by each of the eyes in ordinary near-view, binocular stereopsis of the type hereinbefore described. This parallactic or relative displacement of various components of the scene viewed which lie at different distances from the observer during such relative movement, or before and after the time interval between successive views, enables the observer to form a mental concept of depth, relative distance and spatial relationship of various components of the scene viewed, even though the observer is at a very considerable distance therefrom. This is the type of stereopsis which normally takes place during the landing of an aircraft under visual contact conditions with the landing strip and allows the pilot to make a very accurate and safe landing.

In an aircraft blind landing system of the type described herein, wherein a visual image in true perspective indicating the spatial locations of selected points identifying a landing strip or airport is produced in the aircraft approaching the airport for guiding the pilot to a safe landing, it is quite desirable that the above-described motion stereopsis effect be preserved in its entirety so that the pilot's simulated visual contact with the airport will be normal and of optimum effectiveness and so that the pilot may take full advantage of his normal depth perception, distance and spatial relationship perception of the selected points around the landing strip, which he perceives from the image produced in the aircraft.

Unfortunately, however, the effectiveness of motion stereopsis is seriously impaired by the usual method of viewing a relatively small image such as would appear on the end of a cathode-ray tube, for example. The reason for this is that when the eyes focus on the screen of a cathode-ray tube at short range, an ocular, muscular accommodative effort of the pilot's eyes occurs, including both an inward convergence of the eyes upon the image and a short range focusing of the eyes. The mere fact that such muscular focusing and converging effort has taken place prevents the production of the desired mental concept in the pilot's mind, since while sensory perceptual messages (relating to motion stereopsis) are being received by the optical perceptual center of the pilot's brain, simultaneously other sensory perception signals (relating to the accommodative effort required) are being received by the optical perceptual center of the brain. These two sets of signals are in conflict and therefore no clear-cut mental concept of the type normally produced in viewing a distant scene is produced. True enough, the eyes see an image of various points corresponding to selected locations around the landing strip in true perspective, but the focusing and converging effort produced by reason of the near image viewing conveys to the brain of the pilot the predominant message that he is focusing at short range, is observing a flat image or picture, and is not viewing a distant image, such as the airport would be under actual visual contact landing conditions from the attitude and position of the aircraft approaching the landing strip. Thus much of the effectiveness of such a blind landing system is lost under such viewing conditions.

It should be noted at this point that the distant viewing conditions referred to are generally such that the eye is at infinity focus and therefore the preferred viewing means of my invention relaxes ocular focus and convergence to a point virtually the same as normal infinity viewing conditions.

Furthermore, it is desirable, if the optimum degree of naturalness is to be achieved, that a similitude of viewing angles be preserved. In other words, the virtual angular relationships between various components of the viewed image must closely equal the corresponding pupillary angular relationships of corresponding components of the original scene, from the position and attitude of the original scene translator (in the case of an aircraft landing system of the type herein described, from the position and attitude of the scanning transmitting antenna means carried by the aircraft). If this similitude of viewing angles is not preserved, spatial distortion occurs, as will readily be understood from considering the virtual angles subtended by two objects of equal size, one in the foreground of a distant scene, and the other a predetermined distance behind the foreground object, and also considering what happens when a near image of said distant scene is produced wherein both of the objects subtend larger pupillary angles than the normal viewing angles thereof in the original distant scene. It will be clear that if the angle subtended by the image as a whole is twice the angle subtended by the original distant scene, the angles subtended by each of the objects will be doubled also, apparently placing the distant scene much closer to the observer. (This is precisely what is done in telephotography, for example.) The apparent distance of the two hereinabove-mentioned foreground and background objects from the observer will both be greatly shortened, but not proportionately, however. The apparent distance distance between the observer and the background object is shortened proportionately more than the distance between the observer and the foreground object, thus producing, in effect, a depth compression of the scene viewed, as seen in the image, and effectively bringing the background closer to the foreground. This effect graphically obtains in newsreel telephotography of a baseball game taken from the catcher's position with the pitcher pitching the ball directly toward the camera; apparently the distance between the pitcher and the batter and catcher is reduced to about one-third the actual distance and the distortion is disconcerting. This is also apparent in head-on views of race horses in action, when apparently an interminable period of time is consumed during what appears to be a forward movement of relatively slight amount.

It can readily be understood from the examples just described that if such depth compression of the scene in the line of sight were to occur, even to a much lesser extent than in the examples illustrated, during an aircraft landing, disastrous and perhaps fatal results would very likely occur. If the illusion of normal viewing conditions and spatial relations is to be attained, the similitude of viewing angles must be closely preserved.

It should also be noted, that the viewing apparatus of the present invention, while described and illustrated herein in conjunction with an aircraft blind landing system, is not limited to such use and may be used wherever relatively short range viewing of relatively small images corresponding to larger, more distant original scenes occurs, such as, for example, in the viewing screens of television sets and the like. In use on television sets or the like, while it is desirable to preserve similitude of viewing angles for the reasons hereinabove set forth, absolute correctness in the matter of depth perception is not of critical importance, and the similitude of viewing angles may be modified or dispensed with, if desired, under certain circumstances. It should be noted in this connection that one of the main problems encountered in popularizing television is the small size of the image viewed by the observer. The average person, being used to motion pictures of large size, has not been able to accustom himself to viewing plays, sporting events and general informative and entertainment visual sequences on a small screen. The viewing means of the present invention has a tremendous advantage in that it is essentially dimensionless and creates the illusion of a large-size television screen without the problem of illuminating a large screen. This occurs by reason of the fact that the viewing means of the present invention duplicates in virtually every detail the situation at the original scene and the observer apparently is viewing the original scene with all elements thereof full size.

However, wherever some precise operation or action is to be predicated upon concepts formed in the mind of an individual by reason of optical perception of spatial relationships, the similitude of viewing angles must be preserved. As an example illustrative of this, if a guided missile or airplane suitably propelled and remotely controlled by radio or the like, is to be guided toward some distant destination, the best means of so doing is to provide the guided missile or aircraft with optical perceptual means carried on the guided missile or aircraft, such as a television camera positioned in the nose thereof and televising a selected space segment ahead of the guided missile or aircraft and transmitting such television picture to the remote control or guiding station, where the space ahead of the guided missile may be viewed by the controlling operator at the remote station apparently from the attitude and position of the nose of the guided missile, and may be controlled and guided accordingly by the controlling operator at the remote station. In such an arrangement it is highly desirable that the controlling operator at the remote station see the space segment scanned by the television camera in the guided missile in as natural a manner as possible. Therefore the use of the improved viewing means of the present invention, preserving similitude of viewing angles, is highly desirable, since no distortion of the space segment viewed will occur and the controlling operator may very accurately, remotely guide and control the guided missile or aircraft from the remote controlling station, which may be on the ground or on another controlling or "mother" aircraft in the vicinity, or quite distant therefrom.

With the above points in mind, it is an object of this invention to provide a system and method of producing an artificial image of selected points, patterns or scenes wherein the imagery of such points, patterns or scenes is accomplished by Hertzian wave frequencies of radiation (as compared to visual wave frequencies) and whereby imagery components are conducted to the viewing point and presented to the viewer in a manner whereby the above objects thus viewed will appear to occupy their actual positions in space in true perspective and spatial relationship relative to the position of the viewer.

Another object of this invention is to provide a system and method of producing an artificial image of selected points, patterns or scenes wherein the imagery of such points, patterns or scenes is accomplished by any frequency of radiation and whereby imagery components are electronically conducted separately to several viewers, whereby the above objects thus viewed will appear to occupy their actual positions in space in true perspective and spatial relationship relative to some selected viewpoint other than a viewer such as might be occupied by a television camera.

It is another object of the present invention to provide a system and method for space scanning by means of Hertzian waves and producing on a field of view visible indications corresponding to components of an original scene.

It is a further object of this invention to provide a Hertzian wave space-scanning system in which a Hertzian wave pattern is produced in space in a manner whereby some characteristic thereof differs in accordance with coordinates thereof with respect to the origin of the Hertzian wave pattern.

Another object of the present invention is to provide means and methods for producing a perspective reproduction of selected points identifying a landing strip which is presented to the pilot of an aircraft approaching the landing strip in a manner minimizing ocular converging and focusing effort and preserving similar viewing angles to the actual viewing angles of the selected points identifying the landing strip from the attitude and position of the aircraft, whereby the reproduction appears to the pilot to be a three-dimensional, true perspective view of the selected points.

Another object of the present invention is to provide an improved system and apparatus for accurate landing of aircraft under unfavorable weather conditions, incorporating means for producing a scanning radiation pattern and beacon receivers with return transmission arranged to effectively produce a picture upon the face of a cathode-ray tube of the landing area outlined in lights in perspective as it would be viewed from the approaching aircraft's position.

Another object of the invention is to provide an improved viewing means for short range viewing of relatively small images corresponding to relatively distant, relatively large scenes in a manner modifying ocular accommodative effort of the observer so as to simulate infinity viewing conditions.

Another object of the invention is to provide an improved viewing means for short range viewing of relatively small images corresponding to relatively distant, relatively large scenes in a manner modifying ocular accommodative effort of the observer so as to simulate infinity viewing conditions and preserve a similitude of viewing angles whereby a virtually distortionless image of the original scene is produced.

Other and allied objects will become apparent to those skilled in the art from an examination, study and perusal of the specification, illustrations, and appended claims. To facilitate understanding, reference will be had to the appended drawings, in which:

FIG. 1 is a diagrammatic, electrical schematic view of one illustrative form of the aircraft blind landing system forming a part of the present invention.

FIG. 2 is a forwardly directed, fragmentary view of an aircraft cockpit showing one embodiment of the viewing means of the present invention in operative position with respect to the pilot's chair. (Viewing means fastening strap for fastening the viewing means in operating position with respect to the pilot's eyes and head is not shown for purposes of clarity.)

FIG. 3 is a fragmentary, enlarged, perspective view of one illustrative form of the viewing apparatus of the present invention.

FIG. 4 is a fragmentary enlarged perspective view of a second illustrative form of the viewing means of the present invention.

FIG. 5 is an illustration of the viewing means shown in FIG. 2 and the mounting apparatus therefor from the aspect of the pilot.

FIG. 6 is a view taken in the direction of the arrows VI—VI in FIG. 5 and illustrates relative movement of the viewing means about one axis.

FIG. 7 is a plan view of the apparatus shown in FIG. 2 and illustrates relative movement of the viewing apparatus about another axis.

FIG. 8 is a vertical section in elevation of a slightly modified form of the viewing apparatus of the present invention somewhat similar to that shown in FIG. 2. and showing the viewing means held in operative position with respect to the head of a pilot by a head strap.

FIG. 9 is a view taken in the direction of the arrows IX—IX of FIG. 8.

FIG. 10 is a view taken in the direction of the arrows X—X in FIG. 5.

FIG. 11 is a horizontal section of a slightly modified form of the present invention viewed from an aspect similar to that of FIG. 10.

FIG. 12 is a view taken in the direction of the arrows XII—XII of FIG. 11.

FIG. 13 is a view similar to FIG. 3 of a slight modification of the invention, wherein masking means are employed to produce in the eyes of a viewer a silhouette or shape similar to that which would normally be produced by an aircraft windshield frame (or any other desired aperture) so that a binocular stereoptic view of such silhouette will be experienced as though the observer or viewer were observing an original scene through a similarly shaped real aircraft windshield frame (or other aperture).

FIG. 14 is a view similar to FIG. 4 and illustrates a slight modification of the present invention wherein masking means for producing a binocular effect of the type above described in connection with FIG. 13 is employed.

FIG. 15 is a horizontal section of the apparatus shown in FIG. 13.

FIG. 16 is a view taken in the direction of arrows XVI—XVI in FIG. 15 illustrating the two slightly different views of light patterns emitted by the beam splitter as seen from in front of the masking means.

FIG. 17 is a horizontal section of the apparatus shown in FIG. 14.

The Hertzian wave space-scanning system of the present invention, as employed in an aircraft blind landing system, contemplates the use of transmitting scanning antenna means carried by an aircraft or a viewing station which is approaching an airport, and is arranged to produce in a selected space segment, including the airport, a Hertzian wave pattern having characteristics differing according to the coordinates thereof with respect to the transmitting antenna means carried by the aircraft; and further contemplates the use of a plurality of spaced antenna means at the viewed station or airport, preferably spaced around the landing strip in a manner defining or marking same, and identifying selected points with respect to the airport. These may include boundaries or obstacles of any kind which might affect the safe landing of the approaching aircraft. The antenna means around the airport are arranged to receive the Hertzian wave pattern and in response to the coordinate characteristic thereof produce a signal carrying intelligence as to the relative coordinates of the viewed station antenna means with respect to the viewing station transmitting antenna means carried by the approaching aircraft, and a transmitter at the airport is arranged to retransmit the intelligence-carrying signal back to the viewed station or approaching aircraft, where it is reproduced by means defining a field of view corresponding to the airport from the aspect and position of the approaching aircraft.

Various means for achieving the above may be employed and are contemplated and comprehended within the scope of this invention. One specific type of the general system set forth above is described and illustrated and claimed more particularly in the above mentioned copending application of Douglas G. Shearer and William W. Brockway, Serial No. 150,681, filed concurrently herewith and now Patent 2,650,359, and specific details of said system may be found in said application. Generally speaking, it provides a particular type of Hertzian wave pattern in the selected space segment wherein the characteristic, differing according to the coordinates thereof with respect to the viewing station or transmitting antenna carried by the aircraft, are not sequentially produced, the variable characteristic being phase displacement in two directions in accordance with the angular coordinates of the reception point with respect to the transmitting antenna.

The present invention broadly contemplates and includes such position phase modulated Hertzian wave patterns as produced by the system set forth in said copending application and various other phase modulation systems not specifically described therein. Systems employing variable spatially distributed Hertzian wave characteristics in accordance with coordinates of reception thereof with respect to origin thereof, wherein the variable characteristic is other than phase displacement, for example, amplitude variation and other variables also, are comprehended and included herein also.

The present system allows the pilot to see an image apparently in three dimensions through the viewing means of the present invention. The image as seen through the viewer is apparently that of beacon light patterns laid out according to a predetermined plan upon the ground, such as an airport or landing strip, or along an airway indicating the direction and possibly the distance to and identity of an airport, city, town, or airway, and marking and indicating all obstructions in a manner easily identifiable to the pilot.

The underlying principles of the operation of the present invention may be more readily understood from a specific description of one exemplary form of the present invention, which is described and illustrated herein for illustrative purposes.

*Aircraft blind landing system*

The system shown in FIG. 1 includes the apparatus carried by the aircraft, indicated generally at A, in diagrammatic, electrical schematic form, and the ground apparatus indicated at B and including a plurality of Hertzian wave receiving means which are adapted to be positioned adjacent an airport landing strip, and which are shown in block diagrammatic form, together with a master correlating station and return signal transmitter.

The system shown in FIG. 1 at A includes scanning antenna means comprising two separate antenna arrays, indicated generally at 1 and 2, including two crossed-loop antennae 3 and 4, 5 and 6 carried on the aircraft with the antenna array 1 arranged to scan horizontally and the antenna array 2 arranged to scan vertically, simultaneously. Also included in this system at B are receiving antenna means 7, 8 and 9 which are positioned at selected locations with respect to an airport or landing strip and which are adapted to receive the scanning Hertzian waves radiated from the scanning antenna means carried by the aircraft and to effectively, after correlation in a master control and correlation unit and transmitter 10, and retransmission from the transmitter antenna 11 connected therewith, to the receiving antenna 12 carried by the aircraft, cause the production of correspondingly positioned spots on the screens 13 and 14 of cathode-ray tubes 15 and 16, which are positioned in the cabin of the aircraft for viewing by the pilot.

The two crossed-loop antenna arrays 1 and 2 are mounted on rotatable shafts 17 and 18 which are interlocked mechanically by gears. The shaft 17 which is vertical, since it rotates the antenna array 1 about a vertical axis, is connected by gears 19 to a shaft 20 and the shaft 18 which is horizontally arranged, since it rotates the antenna array 2 about a horizontal axis, is mechanically connected by gears 21 to a vertical shaft 22 which is connected by gears 23 to the common driving shaft 20, which is connected to an electric motor 24. It should be noted that the electric motor 24 rotates the common drive shaft 20 which through the gearing rotates the horizontal scanning antenna array 1 about a vertical axis and simultaneously rotates the vertical scanning antenna array 2 about a horizontal axis. The gearing 19 is such with respect to the gearing 23 and 21 that the horizontal scanning antenna array, which rotates about a vertical axis, rotates at a predetermined multiple rate faster than the vertical scanning antenna array 2. This corresponds to customary television practice wherein the horizontal scanning frequency is customarily higher than the vertical scanning frequency, the first-mentioned corresponding to "line" frequency, and the second to "frame" frequency.

It should be noted that while the mounting of the antenna arrays 1 and 2 with respect to the aircraft are not shown in FIG. 1, it is to be understood that the horizontal scanning antenna array 1 may be located on the aircraft in various positions, although it is desirable that it be located on or immediately adjacent to a plane passing longitudinally and vertically through the aircraft and the vertical scanning antenna array 2 may be located at various positions with respect to the aircraft, although it is highly desirable that it be located on or adjacent a plane passing longitudinally and horizontally through the aircraft. Normally the vertical plane will bisect the aircraft longitudinally and vertically, and the horizontal plane will pass through the aircraft laterally, virtually at a level and in a manner whereby the intersection of said planes will virtually spatially coincide with the position of the pilot's eyes when in flying position in the aircraft.

It should also be noted that the vertical axis about which the horizontal scanning antenna array 1 rotates is perpendicular to the principal axis of the aircraft and to the plane of its wings and that the axis about which the vertical scanning antenna array 2 rotates is perpendicular to the principal axis of the aircraft but virtually parallel or collinear with the plane of the wings. Thus with the aircraft in flying position, the antenna array 1 would rotate about an axis transverse to the direction of movement of the aircraft and lying in a virtually vertical plane with respect to the earth and the antenna array 2 would rotate about an axis perpendicular to the direction of the aircraft's movement and in a virtually horizontal direction with respect to the earth.

Antenna arrays 1 and 2 are electrically connected by suitable means to radio transmitter 25 shown in block diagrammatic form for energizing same. In the example illustrated, the antenna arrays 1 and 2 are connected by slip rings and brushes indicated generally at 26 and 27 connected by leads indicated generally at 28 to the transmitter 25. Transmitter 25, in the example illustrated, is arranged to generate a suitable carrier frequency which may be modulated, if desired. It should be noted that the transmitter 25 is electrically connected to each of the loop antennae 3 and 4 of the antenna array 1 and to each of the loop antennae 5 and 6 of the antenna array 2 in phase opposition. Thus the loop antennae of each antenna array are 90° physically displaced and 180° electrically displaced, each of the antennae of each of the antenna arrays producing 90° physically displaced directional radiation patterns which overlap each other and each of which is out of phase with the other field, whereby an equal signal zone is produced at 45° angle bisecting the directional plane of radiation of each of the antennae loops of the given antenna array. This equal signal plane results in a null Hertzian wave transmission plane, since the equal signals in this plane are 180° out of phase and effectively cancel one another. Thus the antenna array 1 effectively produces a highly directional null Hertzian wave transmission plane bisecting the angle between the crossed-loop antennae 3 and 4 and passing through the vertical axis about which the antenna array rotates.

It should be noted at this point that in the particular form described and illustrated, two such null transmission planes, which are mutually perpendicular and which vertically bisect the entire antenna array 1, are produced. Thus during one complete rotation of the antenna array 1 about its vertical axis, four such null transmission planes will sweep horizontally past a given point in space ahead of the aircraft which produces an effect identical with a single horizontal scanning once during a complete revolution at a rate of rotation four times as great.

Similarly, the two mutually perpendicular, crossed antennae loops of the horizontally arranged antenna array 2 are energized in electrical phase opposition in a manner producing two mutually perpendicular null Hertzian wave transmission planes passing through the horizontal axis about which the antenna array rotates, thus producing four complete null transmission planes during one complete vertical scanning rotation of the antenna array 2 about its horizontal axis of rotation. This corresponds to a single vertical scanning at a rate of rotation four times greater than the antenna array 2.

It should be noted that the antenna array 1 scans space horizontally and sequentially produces a dynamic variation in the Hertzian wave space pattern in the space segment by sweeping a vertical null transmission plane horizontally across space which is at a rate of speed considerably higher than the dynamic sequentially produced varying Hertzian wave transmission characteristic produced by the vertical scanning antenna array 2 which rotates a lateral null Hertzian wave transmission plane vertically at a somewhat lesser rate. The intersection of the null planes provides one spot only in 90° space segment where null Hertzian wave transmission occurs and this effectively scans the entire 90° space segment.

At this point it should be observed that the arrangement just described provides a system where the vertical scanning null plane effectively "gates" or controls the horizontal null transmission characteristic in a manner causing the null transmission spot in the selected space segment to sequentially scan the entire 90° solid angle space segment. Another specific form of this broad concept is embodied in the above mentioned copending application of Douglas G. Shearer and William W. Brockway, Serial No. 150,681, filed concurrently herewith and now Patent 2,650,359, and is described, illustrated and claimed per se in copending application of William W. Brockway, Serial No. 150,683, filed concurrently herewith and now Patent No. 2,732,548, wherein the above-referred to "gating" or horizontal scanning component in accordance with the vertical scanning component is accomplished electronically rather than in the manner described and illustrated herein.

In the example illustrated in FIG. 1, two cathode-ray tubes 15 and 16 are shown diagrammatically and are intended to produce an image corresponding to selected locations around a landing strip. Each of these tubes is provided with the usual electron gun, not shown, and is provided with electron beam control electrodes 29 and 30 and two pairs of electrostatic vertical and horizontal deflecting plates 31 and 32. Fluorescent viewing screens 13 and 14 are also provided in the ends of the tubes 15 and 16. Each of the electron beams emitted by the electron guns produces a visible spot on the screen of the corresponding cathode-ray tube in a position determined by the potential applied to the deflecting plates of the tubes. The deflecting plates 31 and 32 are connected to horizontal and vertical sweep voltage supply indicated in block form at 33 which in the example shown comprises a suitable source of D.-C. potential fed a variable rotatable potentiomer 34 which is rotated by the common drive shaft 20 at the same rate as the rate of rotation of the horizontal scanning antenna array 1. Said D.C. potential is also applied to a second variable rotatable potentiometer 35 which is rotated by the vertical shaft 22 driving the vertical scanning array 2. This arrangement is such that resistance variations produced in the horizontal sweep driven potentiometer 34 and vertical sweep driven variable potentiometer 35, which are supplied with voltage from the constant voltage source, produce a suitable horizontal sweep voltage applied to the horizontal deflecting plates 31 of the cathode-ray tubes 15 and 16 which is synchronized with the horizontal space scanning of the antenna array 1, and which also produces a vertical sweep voltage which is applied to the vertical deflecting plates 32 of the tubes 15 and 16 and which is synchronized with the vertical space scanning of the antenna array 2. Thus, at any given instant, the position of each of the cathode-ray spots on the screens 13 and 14 of the cathode-ray tubes 15 and 16, provided the electron beam control electrodes 29 and 30 allow the beam to pass through the tube, will correspond to the position of the null Hertzian wave transmission spot in the 90° solid angle space segment ahead of the aircraft.

The points of maximum and minimum value of the resistance comprising the variable potentiometers 34 and 35 bear a predetermined relation to the angular position of the antenna arrays 1 and 2, thus determining the centering of the image viewed on the cathode-ray screens 13 and 14 with respect to the actual space centering of the original scene as viewed from the nose of the aircraft. This predetermined relationship may be selectively adjusted by means shown in FIGS. 5, 6 and 7 which will be hereinafter described, for effectively altering the relative centering of the image with respect to the real scene viewed along the longitudinal axis of the aircraft. In other words, by adjusting resistance relationships in the sweep voltage supply, the apparent direction of view from the attitude and position of the aircraft as luminescently reproduced, is altered. It should be noted that the sweep voltage supply means 33 may employ suitable amplifying means for producing the proper sweep voltage potential which may also be controllable for varying the effective size of the image luminescently produced.

A receiving antenna means 12 is carried by the aircraft and connected to electron beam control voltage supply means indicated generally at 36 in block form and which includes a radio receiver connected to the receiving antenna 12 and tuned to the frequency transmitted by the antenna 11 at the airport connected to the correlating and transmitting unit 10 at the airport. It should be noted that the signal transmitted from the master control and correlating unit 10 at the airport and received by the antenna 12 on the aircraft is modulated in accordance with the space-time coordinates of the locations of the receiving antenna means 7, 8, 9 etc. positioned around the landing strip at appropriate points. Thus the radio receiver included in the electron beam control voltage supply unit 36 produces an output which is amplied and rectified and applied to the electron beam control electrodes 29 and 30 in accordance with the space-time coordinates of the airport receiving antennae 7, 8, and 9 with respect to the scanning antenna means comprising the antenna arrays 1 and 2 carried by the aircraft. Thus, the electron beams produced in the two cathode-ray tubes 15 and 16 are allowed, under the control of electron beam control electrodes 29 and 30, to impinge the screens 13 and 14 and produce luminescent spots, each of which positionally corresponds to the space coordinates of the plurality of Hertzian wave receiving antennae around the landing strip. The particular position at which the luminescent spot appears on each of the screens 13 and 14 is determined by the positions of the rotary variable potentiometers 34 and 35 and therefore bears a definite relationship to the position or angle of the planes of the respective crossed loop antennae 3 and 4, and 5 and 6 of the horizontal and vertical scanning antenna arrays 1 and 2.

The receiving antenna means 7, 8 and 9 illustrated at B are adapted to be positioned at suitable points with respect to an airport or landing strip and it is understood that although three such antenna means are shown, any number may be employed. Each such antenna and associated radio receivers 37, 38 and 39 are arranged to receive the scanning Hertzian wave pattern radiated by the scanning means carried by the approaching aircraft and to produce an output signal which is fed into a master control station or correlating unit and return transmitter indicated in block form at 10, where a standard radio transmitter is keyed or modulated in accordance with the output signals received from each of the receivers 37, 38 39.

In a preferred form of the present invention, this keying occurs whenever output received by the correlating unit 10 from any one of the receivers 37, 38, 39 falls to or approaches zero. Thus the return transmitting signal radiated from the ground antenna 11 is keyed whenever anyone of the spaced antenna means positioned along the landing strip lies in the null Hertzian wave transmission zone formed by the intersection of the mutually perpendicular null Hertzian wave transmission planes radiated from the scanning antenna means carried by the approaching aircraft. This keyed return transmission signal, as hereinbefore mentioned, is received by the receiving antenna 12 on the approaching aircraft and through the modulation of electron beams which are synchronized with the scanning movements of the scanning antenna means, causes luminescent spots to be produced on the screens 13 and 14 of the electro tubes 15 and 16 corresponding in position to relative position of the spaced Hertzian wave receiving antenna means 7, 8, and 9 along the airport landing strip from the attitude and position of the approaching aircraft.

The specific apparatus associated with the ground transmitter 10 for keying or modulating the return transmitter carrier wave in the absence of signal from any of the receivers 37, 38 and 39, is not specifically illustrated or described herein, since a number of different types of such means are well known in the art. One such general type of means might employ a circuit of the ordinary automatic volume control type which can be found in any standard radio textbook and wherein the received signal, after having been fed through a suitable amplifier, is arranged to produce a negative D.-C. biasing potential whenever incoming signal is received and which is arranged to not produce said negative D.-C. biasing potential whenever the incoming signal is not received. The negative D.-C. biasing potential may be applied to the grid of an electron tube in a manner preventing the passage of current therethrough and so arranged that whenever said negative D.-C. biasing signal ceases as a result of the incoming signal ceasing, the electron tube will conduct current, which is arranged to key or modulate the output of a radio frequency oscillator producing the return transmission carrier wave for the ground transmitter 10. Numerous other arrangements well known in the art may also be employed for keying the transmitter 10 in the desired manner.

Most effective space scanning may be achieved by correlating the relative rate of rotation of the two antenna arrays 1 and 2 with the effective angle subtended by the null cone produced by the intersection of the two null planes, in order to attain optimum definition in the reproduced image. The rate of scanning may be increased to a point such that each "picture element," as customarily defined in standard television practice, will coincide with the spatial area subtending the null cone, but further increase in scanning rate is useless.

By making the relationships of the variable potentiometers 34 and 35 adjustable with respect to the antenna arrays 1 and 2, the image of the airport receiver means' locations may be "framed" at will. Thus the pilot is able to look straight ahead, downward or in various other directions at will. The most feasible means of doing this is to connect the viewing device in such manner to the sweep voltage variable potentiometers 34 and 35 that when the viewing device is pointed in any particular direction, the field of view for that direction is kept in frame. This has the effect of allowing the pilot to apparently see the positioning of the airport receiver antenna means' locations in whatever direction he is looking. By arranging the limits of the resistance variations of the sweep voltage potentiometers 34 and 35 at suitable angles of rotation of the viewing device, the field of view may be limited to the requirements of the dimensions of the cathode-ray tube screens or to any other desired field of view. Any distortions of the image due to the curvature of the screen surfaces may be corrected by suitable compensation in the optical viewing system.

If an airport attendant is provided with luminescent translating means similar to that carried by the aircraft, he need only synchronize his system to that of the approaching aircraft in order to view the airport from the viewpoint of the pilot of the approaching aircraft. By intermittently connecting and disconnecting one of the radio receivers of known position, the attendant may determine, by the location of the luminescent spot which disappears and reappears, from which direction the aircraft is approaching. Many methods of such synchronizing are available and are known in the art.

*Viewing means*

One embodiment of the viewing means of the present invention per se is illustrated in FIG. 3 wherein means are provided for producing two light patterns corresponding to components of an original scene which, in the specific example illustrated, include two spaced screens 13 and 14 of two cathode-ray tubes 15 and 16 which are positioned so that light emitted from virtually similar images on the two screens 13 and 14 will be received by the optical viewing means indicated generally at 40 and which includes spaced lens means 41 and 42 mounted in a suitable supporting member 43 which is arranged for use by an observer in simultaneously viewing the images formed. In the preferred form of the invention the lens means 41 and 42 act as plus lenses and the separation of the optical center lines is arranged to be at normal pupillary distance whereby ocular accommodative effort of the observer will be minimized so as to virtually simulate normal ocular infinity viewing conditions when simultaneously observing the two similar images formed, which results in the observer apparently seeing the original scene in space at the proper real distance. Differently stated, the lens and separation of the images obviates the ocular convergence and focus effort which takes place when a picture is observed at close range, and by the elimination of this effort the image will take on the appearance of being at a position in space dictated by its perspective and motion.

A modified form of the viewing means of the present invention per se, slightly different from that shown in FIG. 3, is illustrated in FIG. 4 wherein the means for producing two light patterns corresponding to components of an original scene include a single cathode-ray tube 44 having a single viewing screen 45 in the end thereof arranged so that light emitted by an image produced on said screen will be received by beam-splitter means, indicated generally at 46, which will split the image and produce two similar light patterns separated by the normal inter-pupillary distance directed toward and adapted to be received by the lens means 41′ and 42′ carried by the holder 43′ in a manner similar to that described in connection with FIG. 3. The lens means 41′ and 42′ are preferably of the plus lens type arranged to relax ocular focusing effort of an observer, and the separation of the two light patterns obviates the necessity of ocular convergence of the observer's eyes. Both the ocular focusing effort and ocular converging effort of the observer's eyes are preferably relaxed to such values as to be virtually identical with normal ocular infinity viewing conditions, whereby the image is apparently viewed at a distance from the observer equal to the original scene's real distance from the point of recording thereof, such as the point at which a camera or other scene-recording device (or, in the case of the aircraft blind landing system of the present invention, the scanning antenna means carried by the aircraft) is positioned with respect to the original scene.

The specific form of the present invention described and illustrated herein, in combination with the aircraft blind landing system hereinbefore referred to, is of the first-abovementioned type, employing two cathode-ray tubes. FIG. 2 illustrates such a viewing means and means for mounting same in an aircraft cabin in operative position with respect to the chair in which the pilot of an aircraft will sit while flying same, whereby the pilot may readily look into the viewing means for observing a true perspective image corresponding to selected locations around the landing strip which he is approaching to land his aircraft upon.

Referring to FIG. 2, one form of mounting apparatus, indicated generally at 47, is shown for mounting the viewing apparatus indicated generally at 48 in a manner whereby the relative orientation of the viewing means 48 about a vertical axis with respect to the orientation of the horizontal scanning antenna array 1 and the relative orientation of the viewing means 48 about a horizontal axis with respect to relative orientation of the vertical scanning antenna array 2 may be controlled. The mounting means shown in FIG. 2 includes a base 48a fixed to the interior wall of the aircraft ceiling, which carries two spaced bracket members 49 which are laterally ported and mount a horizontal shaft 50, which rotatably carries a member 51 and a fixed tape-carrying drum 52, which is not rotatable with respect to the bracket 49. The rotatable member 51 is connected by a rod 53 with a similar rotatable member 54 mounted upon a shaft 55 on which is also mounted a second cylindrical tape-carrying drum 56 in such manner as to be rotatable with respect to the member 54 connected to the rod 53. Rotatable member 56a is also mounted on the shaft 55 and is provided with a downwardly extending rod 57 connected to a member 58 which is rotatably mounted with respect to a rotatable tape-carrying cylindrical drum 59, to which is laterally affixed bracket means 60 which carry a laterally, horizontally arranged fixed tape-carrying drum 61 and a member rotatable with respect thereto indicated at 62 carrying a laterally extending arm 63 connected to a similar member 64 mounted vertically adjacent to a tape-carrying drum 65 which is rotatable with respect thereto. The rotatable tape-carrying drum 65 is connected to one rotatable portion of a vertically positioned Selsyn motor 66 and the other rotatable portion of the Selsyn motor is connected to the rotatable portion of a second horizontal Selsyn motor 67. The Selsyn motor 67 is arranged to rotate about a horizontal axis which, in turn, carries the viewing means, indicated generally at 48. It should be noted that the drums 52 and 56 carry a continuous tape 68 in frictional engagement therewith and that the drums 56 and 59 carry a second continuous tape 69 in frictional engagement therewith. It should also be noted that the drums 61 and 65 carry a continuous tape 70 in frictional engagement therewith.

This arrangement makes it possible to move the viewing means 48 in various directions so as to position the viewing means conveniently for use by the pilot and at the same time to maintain the centering or "framing" of the images produced on the cathode-ray tube screens in accordance with the direction of the viewing means. This occurs by reason of the fact that if relative rotation of the Selsyn motor 66 or the Selsyn motor 67 does not occur during movement of the viewing means 48 with respect to its mounting base 48a, the viewing means will maintain the same relative directional orientation with respect to the longitudinal axis of the aircraft. However, if the viewing means is moved so as to change its relative directional orientation with respect to the longitudinal axis of the aircraft, either about a vertical axis or about a horizontal axis, relative rotation between the component parts of the Selsyn motor 66 or 67 will occur. This relative rotation of either or both of the Selsyn motors 66 and 67, through electrical connecting means, not shown, is adapted to produce a corresponding effective relative rotation of the associated variable potentiometer 34 or 35 with respect to the contacting brushes in engagement therewith, thus effectively altering the corresponding sweep voltages applied to the deflecting plates of the cathode-ray tubes and apparently altering the direction of view to virtually correspond to the direction toward which the viewing means 48 is aimed. The relative rotation between the various elements of the mounting means may be frictionally or otherwise suitably restrained so that the viewing means 48 will stay in any position to which it is moved. This or other restraining means may be particularly necessary at the point where the mounting means is affixed to the bracket 49, since considerable counterclockwise torque must be exerted upon the element 51 in order to properly support the viewing means 48.

FIGS. 6 and 7 illustrate relative rotation of the viewing means 48 producing relative rotation of the Selsyn motors 67 and 66.

FIG. 10 is a horizontal section taken along the lines X—X of FIG. 5 and illustrates one embodiment of the present invention operating in accordance with the form illustrated diagrammatically in FIG. 3, wherein cathode-ray tube screens 13′ and 14′ are arranged at each side of and slightly below the balance of the viewing means in a manner whereby light emitted from images produced thereon will be upwardly and inwardly directed against diagonally inclined reflecting surfaces 71 and 72 which are adapted to reflect the light patterns forwardly so as to pass through lens means 73 and 74 carried in holder 75, the lens means 73 and 74 preferably being of the plus lens type adapted to relax focusing effort and also containing prisms directed and adapted to relax ocular convergence, whereby normal ocular infinity viewing conditions will be simulated.

In the form of invention illustrated in FIG. 10, the reflecting surfaces 71 and 72 may be formed on the back of the prisms or may merely be the usual mirror means and may be partially light-transmitting, such as in the case of half-silvered mirrors, for example, thus making it possible for the pilot to view the face of either of the instruments, indicated generally at 76 and 77, positioned behind the light-transmissive reflecting surfaces 71 and 72, either of which may be selectively illuminated by lamp means, not shown, under the control of switch means arranged for manual actuation by the pilot (also not shown). It should be noted that each of the instruments 76 and 77 should preferably be positioned behind the half-silvered mirrors 71 and 72 the same distance as the cathode-ray tube screens 13' and 14' are spaced therefrom in order that the appropriate lens means 73 or 74 will focus the instrument face in a manner similar to the normal focusing of the image on the cathode-ray tube face.

The system as just described operates as follows. The pilot of an aircraft approaching a landing strip under poor visibility conditions is viewing the artificial image luminescently formed of the selected points identifying the landing strip through the use of the viewing means shown in FIG. 10, and if he desires to ascertain speed or altitude, he presses the appropriate control button which illuminates the proper one of the two indicating instruments 76 or 77, which he will then see through one of the lenses 73 or 74, at the same time that he also observes the image of the points identifying the landing strip. If he desires to ascertain the other instrument reading, after releasing the first control button he may actuate a second control button, illuminating the other indicating instrument 76 or 77, which will be viewed through the other lens 73 or 74 simultaneously with the view of the selected points identifying the landing strip produced by the cathode-ray tube screens 13' and 14'. When neither of the control buttons is actuated, the pilot will see only the luminescent image of the radio receiver positions around the airport landing strip and will not see the instrument faces.

The purpose of this arrangement can readily be understood since during the landing of an aircraft it is imperative that the pilot observe certain instrument readings at intervals. For example, it is necessary to know the air speed and the altitude and it would be inconvenient for the pilot to alternately look at an instrument in its customary position on an instrument panel in an aircraft cabin and place his head against the viewing means of the present invention and view the images corresponding to selected receiver locations around an airport landing strip, as produced by the viewing means of the present invention. Therefore, the arrangement shown in FIG. 10 is highly desirable in that the pilot may simultaneously observe the positions of the radio beacons along the airstrip and selected instrument readings.

The arrangement disclosed in FIGS. 8 and 9 is quite similar to that shown in FIG. 10 and similar primed reference numerals are employed. However, two virtually semicircular holes 82 and 83 are provided immediately below the lenses 73 and 74 through which the pilot may observe the face of an instrument indicated at 84 by merely lowering his eyes below the viewing level utilized when viewing images produced within the viewing means. This arrangement is intended for the same general purpose as that set forth hereinabove in connection with FIG. 10.

FIGS. 11 and 12 illustrate a slightly modified form of viewing means of the present invention as employed in blind landing aircraft systems wherein a member 78 carries the lens and prism means 73' and 74' and is pivotally mounted at 79 and provided with actuating handle 80 for pivotally swinging the member 78, the lenses 73' and 74' and the reflecting means 71' and 72' carried thereby into or out of operative relationship to the rest of the apparatus. In this arrangement light may be received through the forward end of the viewing means at 81 for true viewing, through the viewing means, of the actual space segment ahead of the aircraft and in the field of view defined by the viewing means. This makes it possible for the pilot to alternately observe the reproduced positions of the radio beacons around the airport landing strip and the real scene corresponding to the image luminescently produced. This may be highly desirable during landing under poor visibility conditions when the pilot may utilize the image produced by the viewing means of the present invention until he is within a very short distance of the airport and sees that he can maintain actual visual contact with the ground.

FIGS. 13, 15 and 16 illustrate a slight modification of the present invention applied to a system of the type generally shown in FIG. 3, and comprises opaque masking means, generally indicated at 100, having two spaced apertures 101 and 102 therein which is arranged immediately adjacent or slightly spaced ahead of the cathode-ray tube screens 13' and 14'. It should be noted that the apertures 101 and 102 are preferably of equal size and the optical centers thereof are separated by a distance slightly less than the optical centers of the images formed on each of the cathode-ray tube screens 13' and 14', whereby an observer viewing the two images through the viewing means, including the masking means 100, finds that the masking means, with respect to the luminescent image on the luminescent screen 13', has apparently moved to the right, as viewed by the left eye of an observer, and that masking means 100 has apparently moved to the left with respect to the luminescent image formed on the cathode-ray tube screen 14', as viewed by the right eye of an observer. This is precisely the same situation that occurs when an observer peers out of a window or other aperture defined by a window frame or boundary therearound and views a distant scene, the modified form of the viewing means of the present invention employing the masking means thus producing a mental concept in an observer using said viewing means precisely the same as would be produced in the mind of an observer during the viewing of a distant scene such as an airport landing strip through an aircraft window. Furthermore, the relationship of the transparent window frame with respect to the distant scene viewed conveys information to the mind of the observer or pilot as to the attitude and position of the aircraft with respect to the landing strip. This, in effect, produces a combined image wherein the edge or frame portions are of binocular stereoscopic type and the central portions of the image corresponding to a distant scene are of a type wherein motion stereopsis rather than binocular stereopsis is employed for ascertaining the relative spatial positions thereof.

The apparatus shown in FIGS. 14 and 17 illustrates the slightly modified form of the invention employing masking means for the purposes hereinabove described, utilized, however, with the same viewing means generally illustrated in FIG. 4, wherein a single cathode-ray tube screen 45' is employed in conjunction with beam-splitter means indicated generally at 46'. Opaque masking means 100' having two spaced apertures 101' and 102' is positioned in front of the beam-splitter means 46' and is arranged to limit each of the light patterns from the beam splitter means in the same manner as hereinabove described in connection with FIGS. 13, 15 and 16, whereby to produce a combined image having edge portions effectively of a binocular stereoscopic type and having a central portion effectively of a motion stereoposis type, as herein more fully described. Although the apertures 101' and 102' in the masking means are shown as of virtually rectangular shape, they may take any desired form and preferably should be of a contour similar to the shape of the aircraft window frame or other aperture from which it is intended that an observer will be viewing the original scene. Although the masking means have been described and illustrated in connection with the simple forms of the invention illustrated generally in FIGS. 3 and 4, it will be readily understood that the masking means will cooperate with the cathode-ray tube screens in the forms of the invention illustrated generally in FIG. 2 and FIGS. 5–12, inclusive. This is not shown specifically since the manner of such cooperation is clearly set forth hereinabove in connection with the description of the forms of the invention shown in FIGS. 13–17, inclusive, and will be readily understood.

Numerous modifications and variations of this invention are within the spirit and scope hereof and all such are intended to be included and comprehended herein, the examples described and illustrated herein being exemplary only. For example, the space-scanning system employed specifically herein as an aircraft blind landing system may employ various types of directional antennae other than those specifically described and illustrated herein. One illustrative variation of the many possible directional antennae is to employ in each antenna array, corresponding to the antenna arrays 1 and 2, two antennae, each being a continuous loop, somewhat similar to 3 and 4 of antenna array 1 and 5 and 6 of antenna array 2, but being in the form of a reverse loop having portions lying in two intersecting planes which may be displaced anywhere from a few degrees apart to 90° or even more apart in physical displacement. It will be understood that this type of directional antenna produces null Hertzian wave transmission planes quite similar to that produced by the antenna means illustrated and described herein. There are numerous other directional antenna means that can be employed in the present invention.

It may be desirable under some circumstances to modulate the vertical and horizontal scanning Hertzian wave radiations and to employ variations in the detected modulations at the receiver stations to control the keying of the return transmitter. The present invention can employ distinct transmitters producing Hertzian waves of different frequencies for energizing the vertical scanning antenna array and the horizontal scanning antenna array which may be desirable under certain circumstances. In such case, each receiving antenna means positioned around the airport may employ two antennae arranged to receive the two different Hertzian wave frequencies radiated from the vertical and horizontal scanning antenna means carried by the aircraft, if desired, or both frequencies may be received at each point by singular antenna means and the two frequencies separated by dividing networks and employed in conjunction to control the keying of the return transmitter in a manner conveying intelligence as to the coordinates of that particular receiving antenna.

It should be noted that some inaccuracy will result in the present system as a result of the transit time occurring between radiation of the scanning Hertzian wave pattern and reception at the aircraft of the intelligence-carrying return signal. However, this inaccuracy diminishes as the airfield is approached and is not serious if the scan rate is slow and if desired, may be compensated for by introducing corresponding lag in the sweep voltages applied to the deflector plates of the cathode-ray tubes carried by the aircraft. The necessary lag to so introduce may be ascertained by any means conveying intelligence as to the transit time delay, such as, for example, the radiation of a standard reference frequency from the aircraft to the ground where it may be received and arranged to key the transmitter and be returned to the aircraft and received thereby. The return signal may be compared with the original signal and the transit time ascertained to utilize in the control of sweep voltages applied to the cathode-ray tubes. This may be done in a variety of ways well known in the art. One such method is to utilize phase comparison techniques, a specific form of which is disclosed and described more particularly in copending applications of Douglas G. Shearer and William W. Brockway, Serial No. 150,681, now Patent No. 2,650,359 and of William W. Brockway, Serial No. 150,683, and now Patent No. 2,732,548, both filed concurrently herewith.

It should also be noted that the viewing means of the present invention as employed in the aircraft blind landing system, or in any other type of viewing system, such as television system, is primarily intended for binocular viewing of two identical images. However, it is not limited to either binocular viewing or to viewing identical images. It may be employed monocularly and, under some circumstances, it may be employed for viewing two quite similar images of the same original scene considered from slightly different positions, if desired.

It should be noted that in the viewing means of the present invention the physical orientation of the cathode-ray tubes and the question of whether one or two reflecting surfaces is employed is not important, since the positioning, erecting, or reversal, or, in fact, and desired orientation of the two images may be electrically accomplished.

It should also be noted that in the viewing means of the present invention of the type generally shown in FIG. 3, there has been illustrated an arrangement wherein the convergence of an observer's eyes is relaxed virtually to infinity focusing conditions by means of the spacing between the two cathode ray tube screens, and in the form of viewing means of the present invention generally illustrated in FIG. 4 it has been made unnecessary for an observer's eyes to converge by arranging the beam splitter so as to produce two light patterns separated by a distance virtually equal to the normal ocular interpupillary distance, thus simulating infinity viewing conditions. However, the present invention is not limited to this arrangement, since it is possible to position the two images or light patterns at various distances apart, and, through the use of suitable prism means, refract same so that an observer's eyes will apparently view the images under virtually normal infinity viewing conditions. It is also possible that means other than simple plus lens means be utilized in viewing the images.

The variable potentiometers 34 and 35 described and illustrated herein for producing the cathode-ray sweep voltages may be modified or dispensed with entirely and the sweep voltages may be produced in any desired manner other than that described and illustrated herein. For example, electronic saw-tooth wave-generating means may be employed, and in order to provide synchronization thereof with the rotation of the scanning antenna means, the saw-tooth generator may be triggered by a synchronizing voltage harmonically related to a voltage applied to a synchronous driving motor for rotating the scanning antenna means, thus interlocking the scanning antenna and the cathode-ray tube sweep voltages. Various other means well known in the art may be employed for this purpose.

The examples described and illustrated herein are exemplary only and are not intended to limit the scope of this invention, which is to be interpreted in the light of the appended claims only.

I claim:

1. In a spatial orientation system, the combination of: a scanning station and a plurality of spaced remote scanned stations; radiating antenna means at the scanning station having directional scanning characteristics; receiving antenna means at each of the scanned stations; means for transmitting Hertzian wave signals from the radiating antenna means at the scanning station, the scanning station radiating antenna means being arranged to scan a selected space segment by producing in said space segment a Hertzian field wherein all points of the field in any one plane at any one instant of time have characteristics uniquely different from all other points in accordance with the spatial coordinates of said points with respect to the scanning station radiating antenna means; means for producing an intelligence signal in timed relationship with the existence at each receiving antenna means of a predetermined condition of Hertzian wave characteristics; means for collecting said intelligence signals and combining them into a series of signals, the time intervals among signals in the series being significant as to direction of scanned stations from the scanning station; means for transmitting the series of signals to the scanning station; and means at the scanning station for receiving said intelligence signals and translating same into a visible indication of the direction of each of the antenna means at the scanned stations as viewed from the scanning station.

2. Apparatus of the character stated in claim 1 wherein the spatially varying characteristics of the Hertzian field comprise relative phase displacements in accordance with said spatial coordinates.

3. Apparatus of the character stated in claim 1 wherein the antenna means at the scanning station is arranged to produce a Hertzian field, in the selected space segment, wherein the momentary characteristics vary differently at any one instant of time at various points in the selected space segment, in accordance with the coordinates of said points referred to the scanning station radiating antenna means, and wherein at a subsequent instant of time said momentary characteristics will have different values at said various points.

4. Apparatus of the character stated in claim 3 wherein means are provided for moving the antenna means at the scanning station to impart two-directional scanning movements to the directional characteristic of the Hertzian wave signals whereby the latter recurrently, momentarily point toward a scanned station to recurrently, momentarily establish a predetermined condition of Hertzian wave propagation between the antenna means at the scanning station and the antenna means at that scanned station.

5. Apparatus of the character stated in claim 4 wherein the means at the scanning station for translating the intelligence signal into a visual image comprises cathode ray tube means operated in timed relationship with the movements of the scanning station antenna means.

6. Apparatus of the character stated in claim 5 wherein said intelligence signal is produced only momentarily.

7. A system of the character stated in claim 1 wherein the means for producing a visible indication on a field of view is of luminescent type and includes means for producing two light patterns corresponding to receiving antenna means' relative direction from the radiating antenna means, and optical viewing means arranged to cooperate with an observer's eyes and to receive the two light patterns and refract and direct said light patterns into the observer's eyes without requiring material muscular focusing and convergence effort of the observer's eyes.

8. A system of the character stated in claim 7 wherein the luminescent visible indication-producing means includes two spaced cathode-ray tubes arranged to simultaneously produce visible indications corresponding to receiving antenna means' relative direction with respect to the scanning station.

9. A system of the character stated in claim 1 wherein the optical viewing means effectively includes two laterally spaced plus lenses effectively refracting the spaced light patterns received thereby, in a manner similar to ocular short-range focusing of the observer's eyes, thereby minimizing the required focusing effort of the observer's eyes.

10. A system of the character stated in claim 9 wherein the plus lens means and the two spaced cathode-ray tubes are arranged to present all points of the image viewed by the observer's eyes at viewing angles similar to normal viewing angles of corresponding points of the original scene.

11. A system of the character stated in claim 7 wherein the luminescent visible indication-producing means includes cathode-ray tube means arranged to produce one image illustrating the receiving antenna means' relative direction from the radiating antenna means and wherein beam-splitter means are provided for splitting the light pattern emitted by the luminescent means into two spaced light patterns which are received by the optical viewing means.

12. A system of the character stated in claim 11 wherein the optical viewing means effectively includes two laterally spaced plus lenses effectively refracting the spaced light patterns received thereby, in a manner similar to ocular short-range focusing of the observer's eyes, thereby minimizing the required focusing effort of the observer's eyes.

13. A system of the character stated in claim 12 wherein the plus lens means and the beam-splitter means are arranged to present all points of the image viewed by the observer's eyes at viewing angles similar to normal viewing angles of corresponding points of the original scene.

14. A system of the character stated in claim 7 wherein the Hertzian wave space scanning by the scanning station radiating antenna means, the luminescent means for producing light patterns, and the optical viewing means are all correlated, whereby to present all points of the visible indication arranged for viewing by the observer's eyes at viewing angles similar to normal viewing angles of corresponding points of the original scene.

15. In a system of the character stated in claim 7, the provision of apertured masking means positioned in the path of the two light patterns with the centers of the apertures closer together than the centers of the light patterns, whereby the observer's eyes will apparently view an image of a relatively distant original scene through an aperture apparently relatively close to the observer.

16. In a spatial orientation system, the combination of: a plurality of spaced scanned stations and a remote scanning station; directional radiating antenna means at the scanning station; a receiving antenna at each of the scanned stations; means for transmitting radio signals from the antenna means at the scanning station; means for shifting the directional characteristic of the antenna means at the scanning station to recurrently, successively, momentarily establish a predetermined condition of radio wave propagation between the directional antenna means at the scanning station and each of said receiving antennae; means defining a field of view of the scanning station; means operating in synchronism with the movements of said directional radiation characteristic and adapted when momentarily energized to produce a visible indication in said field of view, the location of which in the field of view is a function of the direction of the scanning station antenna means directional characteristic; means associating said receiving antennae for producing a signal responsive to the existence of said predetermined condition of radio wave propagation at a receiving antenna; means for combining said signals into a series of signals, the time interval among signals in the series being significant as to direction of scanned stations from the scanning station, and transmitting said series of signals to the scanning station; and means at the scanning station for energizing said indicating means responsive to the time of arrival at the scanning station of the signals of said series, whereby a plurality of visible indications are produced on said field of view relatively positioned in accordance with the angular coordinates of each of the receiving antennae with respect to the antenna means at the scanning station.

17. In a spatial orientation system, the combination of: a scanning station and a plurality of spaced remote scanned stations; directional radiating antenna means at the scanning station and means for transmitting Hertzian waves therefrom having a null signal characteristic in one direction; receiving antennae at said scanned stations arranged to receive said Hertzian waves; means for imparting scanning movement to said null signal characteristic whereby it recurrently, successively scans said receiving antennae; means defining a field of view; means operating in synchronism with said scanning movement for producing, when energized, a visible indication on said field of view positioned in accordance with the instantaneous direction of said null signal characteristic; and means for energizing said last named means in response to reception of said null signal characteristic at any of said receiving antennae.

18. A system of the character described in claim 17 wherein the scanning station is mobile, the scanned stations are stationary and the means defining a field of view is at the scanning station, and said energizing means includes radio receiver means operatively connected to said receiving antennae and arranged to produce a signal in response to reception at any receiving antenna of said null signal characteristic.

19. A system of the character described in claim 18 wherein said energizing means also includes a radio receiver at the mobile scanning station and a stationary radio transmitter in communication therewith and arranged to transmit the signals produced by said radio receiver means.

20. A system of the character described in claim 17 in which the directional antenna means at the scanning station comprises two directional antennae, each mounted for independent rotation about an axis at an angle to the axis of the other and to the line of intersection of the scanning station and a scanned station, said antennae having angularly related directional planes, and including means for rotating said two directional antennae about their respective axes at different angular velocities, whereby the directional plane of one antenna recurrently sweeps across a scanned station while the directional plane of the other antenna is moving through a relatively small distance at that scanned station.

21. In a spatial orientation system, the combination of: a scanning station and a plurality of spaced remote scanned stations; directional radiating antenna means at the scanning station and means for transmitting Hertzian waves therefrom having a null signal characteristic in one direction; receiving antennae at said scanned stations arranged to receive said Hertzian waves; means for imparting scanning movement to said null signal characteristic whereby it recurrently, successively scans said receiving antennae; and radio receiving means operatively connected to said receiving antennae including means for producing a signal in response to reception at any of said receiving antennae of said null signal characteristic.

22. A method of visually indicating the angular position of a second station within a selected space segment having a known relationship with a first axis passing through a first station comprising: transmitting from the vicinity of the first station a first Hertzian wave field having different intensities in different radial planes passing through a first axis positioned at an angle to the line of intersection of the stations and intersecting said first station; cyclically moving said field about said first axis to vary a selected characteristic of said field at the second station cyclically between a first predetermined value and other values; transmitting from the vicinity of the first station a second Hertzian wave field having different intensities in different radial planes passing through a second axis positioned at an angle to said first axis and also at an angle to the line of intersection of the stations and intersecting said first station; cyclically moving said second field about said second axis at a rate substantially greater than the rate of movement of said first field, to vary a selected characteristic of said second field at the second station cyclically between a second predetermined value and other values; measuring at the second station the selected characteristic of said first field and the selected characteristic of said second field; producing an electrical signal when said selected characteristics arrive at their respective predetermined values at said second station; establishing a field of view; and producing on said field of view a visible indication responsive to said signal, the angular position of said indication within the field of view being similar to the angular position of the second station within the selected segment.

23. A method as stated in claim 22 wherein said axes are mutually perpendicular.

24. A method as stated in claim 22 wherein said first predetermined value is effectively null.

25. A method as stated in claim 22 wherein said second predetermined value is effectively null.

26. A method as stated in claim 22 wherein said predetermined values are effectively null.

References Cited in the file of this patent

UNITED STATES PATENTS

| Number | Name | Date |
|---|---|---|
| 1,963,788 | Harlow | June 19, 1934 |
| 2,301,826 | Steudel et al. | Nov. 10, 1942 |
| 2,396,112 | Morgan | Mar. 5, 1946 |
| 2,426,184 | Deloraine et al. | Aug. 26, 1947 |
| 2,426,218 | Hopgood | Aug. 26, 1947 |
| 2,426,979 | Ayres | Sept. 9, 1947 |
| 2,433,341 | Busignies | Dec. 30, 1947 |
| 2,439,846 | Dicke | Apr. 20, 1948 |
| 2,449,542 | Ayres et al. | Sept. 21, 1948 |
| 2,455,456 | Whittaker | Dec. 7, 1948 |
| 2,463,474 | Busignies | Mar. 1, 1949 |
| 2,502,974 | McElhannon | Apr. 4, 1950 |
| 2,517,170 | Bernard | Aug. 1, 1950 |
| 2,540,121 | Jenks | Feb. 6, 1951 |
| 2,568,265 | Alvarez | Sept. 18, 1951 |
| 2,572,043 | McElhannon | Oct. 23, 1951 |
| 2,637,025 | Cutler | Apr. 28, 1953 |
| 2,650,359 | Brockway et al. | Aug. 25, 1953 |